Aug. 14, 1928.
G. R. MAUPIN
1,680,798
FLARING EXPANDER
Filed March 25, 1927 2 Sheets-Sheet 1
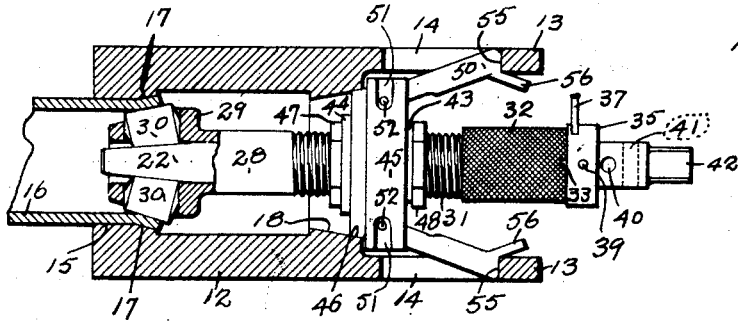
FIG. 1
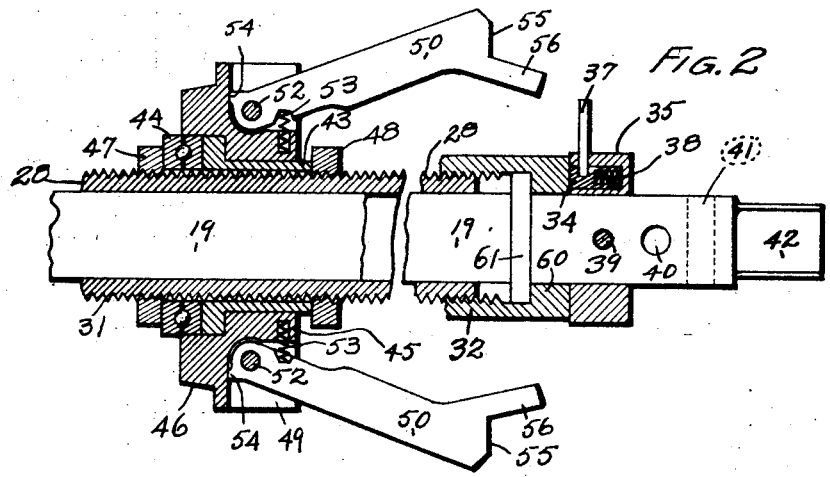
FIG. 2
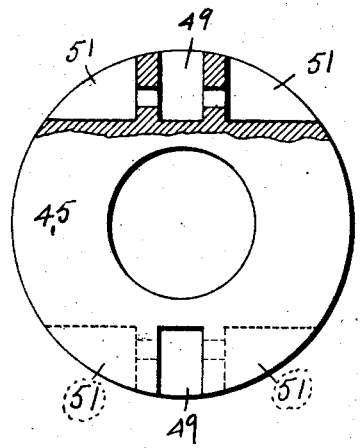
Fig. 3
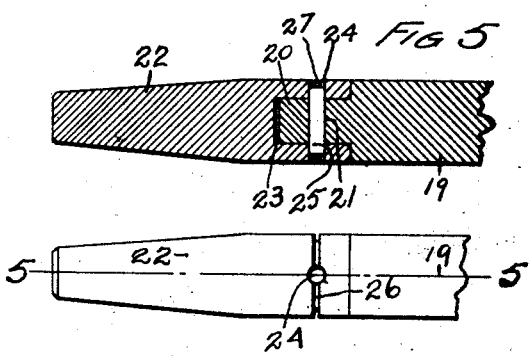
FIG. 5
FIG. 4
INVENTOR
GRAVES R. MAUPIN
By Edward E. Longan
ATTY.

Patented Aug. 14, 1928.

1,680,798

UNITED STATES PATENT OFFICE.

GRAVES R. MAUPIN, OF MOBERLY, MISSOURI, ASSIGNOR TO THE J. FAESSLER MANUFACTURING COMPANY, OF MOBERLY, MISSOURI, A COPARTNERSHIP COMPOSED OF JOHN W. FAESSLER, CHRISTINIA FAESSLER, LOUIS E. FAESSLER, AND GRAVES R. MAUPIN.

FLARING EXPANDER.

Application filed March 25, 1927. Serial No. 178,330.

My invention relates to improvements in flaring expanders, and has for its primary object a flaring expander which is to be used in connection with junction boxes, headers or return bends in oil stills, and also for flaring tubes in steam boilers.

A further object is to construct a flaring expander which is provided with an adjustable gauge, which gauge is so secured as to limit the position of the expander or rather the expander head without interfering with the amount of expansion accomplished thereby.

A still further object is to construct a flaring expander, that is an expanding tool which is used for flaring the ends of tubes in oil stills so that they can be readily flared when the flaring end of the tube is required, or in other cases the ends can be flared preparatory to beading.

There are various types of junction boxes, headers or return bends employed; certain of which use a tapered cap. Others which use a screw threaded plug, either a straight plug or what is commercially termed a "pipe thread". However with my device any of these openings, which are designed to have either screw threaded plugs or tapered plugs inserted, will receive the thrust collar, the thrust collar being arranged to fit the various openings.

In the drawings:

Fig. 1 is a sectional view of a portion of a return bend in which a tapered plug is to be inserted.

Fig. 2 is an enlarged fragmental section of my device showing the thrust collar in detail.

Fig. 3 is an end view of the thrust collar with parts broken away and in section showing the manner of pivoting the securing arms.

Fig. 4 is an enlarged view of the front end of the mandrel employed.

Fig. 5 is a longitudinal section taken on the line 5—5 of Fig. 4.

Figure 6:
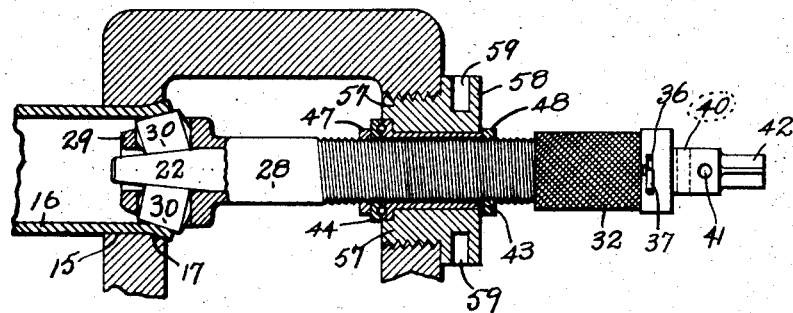
Fig. 6 is a fragmental section of my device illustrating the same when a screw threaded hand hole is employed.

In the construction of my device 12 represents either a junction box or return bend which is provided with ears 13. These ears 13 are provided with slots 14. The forward end of the junction box or return bend is provided with a cylindrical bore 15 through which a tube 16 passes. The rear portion of the bore 15 is provided with a tapered bore 17. Spaced apart and rearward from the bores 15 and 17 is a tapered bore or hand hole 18. This tapered bore is designed to receive a cup-shaped member, which cup-shaped member is held in position by means of wedges and screws, as is well known in the art and, therefore, will not be described in detail.

My improvement consists of a mandrel 19 which is provided on its forward end with a rectangular projection 20. This projection has a bore 21 extending therethrough. Carried by the rectangular portion of the mandrel 19 is a tapered tip 22 which is provided with a rectangular recess 23. The tip 22 is provided with a bore 24 which is of the same diameter as the bore 21 so as to receive the pin 25. The tip is also provided with a circumferentially extending groove 26 in which a snap-ring 27 is inserted. This snap-ring prevents any dislodgment of the pin 25 and securely holds the tip in position.

Snugly fitting the mandrel 19 is a sleeve 28 which is provided at its forward end with a cage 29. This cage is provided with openings through which rollers 30 project. The openings in the cage are preferably made at an angle as fully described by me in a patent issued to me December 19, 1922 bearing Patent No. 1,439,568.

The rear end of the sleeve 28 is screw threaded as indicated by the numeral 31 and on this screw threaded sleeve is mounted a knurled sleeve 32 which has a recess 33 formed in its rear end. This recess is designed to engage with a dog 34 which is slidably mounted in a collar 35. The collar 35 has a T slot 36 formed therein so that the pin or handle 37 can permit the dog to move forward and backward. The dog is moved forward by means of the spring 38.

The collar 35 is secured to the mandrel by means of the pin 39. The mandrel is further provided at its rear end with bores 40 and 41 for the insertion of a lever to rotate the mandrel and also with a wrench engaging surface 42. This wrench engaging surface 42 may also be utilized for the purpose of attaching the device to a chuck.

Slidably mounted on the sleeve 31 is a sleeve 43, the forward end of which is provided with a bearing ball thrust 44 and mounted on the sleeve 43 is a thrust collar 45. This thrust collar is provided with a tapered forward projection when used as illustrated in the junction box of Fig. 1 with the tapered portion 46, which snugly fits the taper 18.

Mounted on the sleeve 28 are nuts 47 and 48 by means of which the thrust collar can be moved forward and backward thus permitting adjustment of the collar on the screw threaded portion of the sleeve so that the same can be adjusted to and from the cage 29. The thrust collar is provided on its rear face with diametrically opposite recesses 49 in which the securing arms 50 are pivotally mounted. The thrust collar is also provided with recesses 51 which are formed in the periphery so as to permit the insertion of the pivots or pins 52. These recesses are clearly illustrated in Figs. 1 and 3. The arms 50 are normally forced outward by means of springs 53 and are limited in their outward movement by projections or dogs 54 so that they will not expand too far.

The securing arms 50 are further provided with faces 55 which engage with the rear ends or faces of the slots 14 and also with projections 56 by means of which the arms 50 can be disengaged from the slots so as to permit the removal of the device.

In Fig. 6 I have shown a modified form of structure in which a thrust collar 57 is employed. This thrust collar is screw threaded so as to fit the screw threaded bore used in certain constructions of oil stills. This bore may be either the tapered plug type, or the cylindrical type. The thrust collar is provided with a flange 58 which has bores 59 therein so that either a spanner wrench or a bar may be used in order to secure the same in position.

The balance of the device is exactly the same as has been previously described, that is especially relating to the adjustment of the cage and the feeding mechanism.

Figure 7:
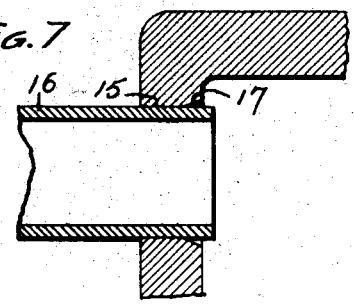
Fig. 7 is a diagrammatic view illustrating a tube which has been rolled in before flaring.

In Fig. 7 I have illustrated diagrammatically first position of a tube when rolled in a header, a return bend or a junction box and in which the tube is to be only flared.

Figure 8:
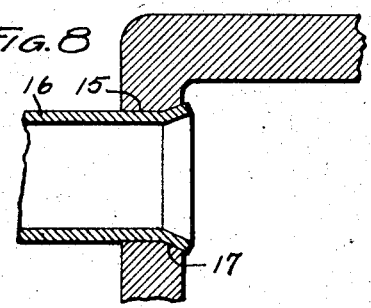
Fig. 8 is a similar view showing the tube flared.
Figure 9:
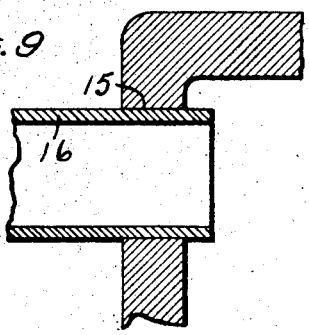
Fig. 9 is a diagrammatic view showing the tube rolled in where the end is to be beaded.
Figure 10:
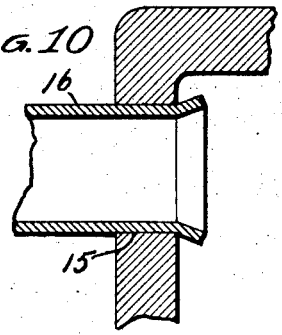
Fig. 10 is a similar view showing the tube as flared before being beaded over.

Fig. 8 discloses the structure of Fig. 7 when the tube has been flared. In Fig. 9 I have shown diagrammatically a view of a tube which is to be beaded, and in Fig. 10 a view similar to Fig. 9 in which the projecting end of the tube has been flared so that the beading operation will be facilitated. In other words, to relieve the tube from as much end thrust as possible during the formation of the bead.

It will be understood, of course, that the taper of the tip 22 and the taper of the rollers 30 can be varied so that the angle of flare can be made to suit various requirements. Therefore I do not desire to limit myself in any way to the exact angle shown as to the taper of the rollers or tip.

It will also be noted from Fig. 2 that the sleeve 32 is provided at its rear end with an inwardly projecting flange 60 which engages with a flange 61 formed integral with the mandrel 19. The purpose of the flanges 60 and 61 will be explained in detail during the description of the operation of my device, as will be the knurling of the sleeve 32.

The operation of my device is as follows: It will be noted from the drawings that the thrust collar illustrated in Figs. 1, 2 and 6 is slidably mounted on the screw threaded sleeve 28, its position being fixed against forward and backward movement by means of the adjusting nuts 47 and 48. Then in applying the device the nut 47 is screwed forward on the screw threaded portion of the sleeve and the nut 48 screwed rearwardly so that the thrust collar together with the thrust bearing will have free longitudinal movement thereon. When the device has been thus arranged, the expander is inserted through the rear opening or hand hole so that the cage together with the rollers will enter the tube to be flared. When this position has been ascertained, the nut 48 is tightened or moved forward on the sleeve 28 so that there will be no further back movement of the thrust collar. The nut 47 is then tightened to position the thrust collar against forward movement. This is the preliminary setting, it being understood, of course, that no expansion or flaring of the end of the tube 16 has taken place. The nuts 47 and 48 are then tightened securely so that no lateral shifting of the thrust collar can take place. The device is then pushed into position and in the case of the implement illustrated in Figs. 1 and 2 the securing arms 50 will be snapped upward by reason of the springs 53 so that the shoulders 55 will engage with the rear ends of the slots 14 and prevent any rearward movement. When in this position the mandrel is pushed forward by rotating the sleeve 32 until the rollers are expanded so as to bear against the tube. Then the dog 34 is released by swinging the pin or handle into such a position that the dog can move forward and engage with the recess 33.

Further rotation of the mandrel rotates the sleeve, and by reason of the flanges 60 and 61 contacting and the screw threads 31, the sleeve 32 is fed forward on the sleeve 28 carrying the mandrel forward and causing the tip 22 to force the rollers 30 outward. All backward movement of the device as illustrated in Fig. 1 is prevented by the securing arms 50, and in the instance of the device illustrated in Fig. 6 by the screw threaded thrust collar 57.

After a sufficient amount of resistance has been met, the dog 34 is withdrawn and the mandrel revolved either by means of a bar, a wrench, or the chuck of some power machine until this resistance has been practically overcome when the mandrel is again fed forward in the manner previously described. This is continued until the desired flare has been obtained after which the entire expander can be readily removed.

It is also to be noted that during the forward feeding of the mandrel the sleeve 32 is practically the sole feeding agency and its limit of movement can be regulated by any well known means, especially by means of an adjustable collar which has been disclosed in my Patent No. 1,439,568 before mentioned, and which limitation of feeding does not form any part of my present invention.

In the disclosure illustrated in Fig. 6 the nuts 47 and 48 are loosened and the thrust collar 57 secured in position by screwing it into the screw threaded opening and after the mandrel and the operating parts have been pushed forward so that the rollers will engage with the tube, the nut 48 is drawn up fairly close. Then the entire device is removed and the nut 47 tightened up after which the screw threaded collar 57 is again placed in position by screwing it into the screw threaded opening. Then the normal operation of the device takes place. It is essential that the thrust collar be held against rearward movement and also against all turning because it is this collar that takes up all the longitudinal pressure exerted by the tool so that when the flaring occurs, there will be no rearward movement whatsoever of the thrust collar, and the cage together with the rollers will be held in fixed position. Furthermore by mounting the thrust collar on a sleeve with a thrust bearing there will be no rotary movement imparted to the collar so that all thrust or movement that this collar will have to contend with will be a tendency to move it backward longitudinally of the axis of the mandrel. In fact one of the essential features of my device is to equip a flaring expander with a thrust collar which is longitudinally adjustable so that tubes or rather the ends thereof can be easily flared either to seat them in flaring bores or to flare them preparatory to beading the ends of the tubes. Therefore, my device is not limited to the structures disclosed in Figs. 1 and 6 but can also be used for the purposes disclosed in the views 9 and 10 in which the ultimate result obtained will be the beading of the tube.

Having fully described my invention, what I claim is:—

1. A flaring expander comprising a sleeve and having a cage on one end thereof, flaring rollers carried by said cage and adapted to be projected radially therethrough, a mandrel located in said sleeve and adapted at its rear end to receive a rotating means so that said mandrel can be rotated, a tapered tip detachably carried by the forward end of said mandrel, said tip contacting with said rollers, means carried by said sleeve for feeding said mandrel forward, means carried by said mandrel and adapted to operatively engage with said feeding means whereby said feeding means is operated when the mandrel is rotated, a thrust collar adjustably and rotatably mounted on said sleeve, said thrust collar adapted to prevent said cage from moving longitudinally when the device is in operation, and means for removably securing said thrust collar in a hand hole.

2. A flaring expander comprising a sleeve, a cage carried by one end of said sleeve, flaring rollers carried by and projecting beyond the periphery of said cage, a mandrel having a tapered tip passing through said sleeve and cage and having its tapered tip contacting with said rollers, said mandrel being arranged at its opposite end for receiving a means for rotating said mandrel, means carried by said sleeve and co-operating with said mandrel whereby said mandrel can be fed forward, an adjustable thrust collar for holding said cage against longitudinal movement in the end of a tube while the same is being flared, and spring actuated means carried by said thrust collar for holding the same in position and against longitudinal movement when the device is in operation.

In testimony whereof I have affixed my signature.

GRAVES R. MAUPIN.